United States Patent [19]

Baghdachi et al.

[11] Patent Number: 5,225,512

[45] Date of Patent: Jul. 6, 1993

[54] POLYMER AND ADHESIVE COMPOSITION

[75] Inventors: Jamil Baghdachi, Northville; Keith H. Mahoney, Grosse Pointe Park, both of Mich.

[73] Assignee: BASF Corporation, Southfield, Mich.

[21] Appl. No.: 752,153

[22] Filed: Aug. 29, 1991

[51] Int. Cl.⁵ .............................................. C08G 77/04
[52] U.S. Cl. .................................... 528/28; 528/19; 528/21; 528/22; 528/30; 528/31; 528/49
[58] Field of Search ...................... 528/28, 19, 21, 30, 528/22, 31, 41

[56] References Cited

U.S. PATENT DOCUMENTS

| | | | |
|---|---|---|---|
| 3,632,557 | 1/1972 | Brode et al. | 528/48 |
| 3,979,344 | 9/1976 | Bryant et al. | 528/22 |
| 4,575,523 | 3/1986 | Anderson et al. | 523/414 |
| 4,666,968 | 5/1987 | Downey et al. | 524/296 |
| 4,954,598 | 9/1990 | Baghdachi et al. | 528/22 |

Primary Examiner—John Kight, III
Assistant Examiner—Duc Truong
Attorney, Agent, or Firm—Paul L. Marshall

[57] ABSTRACT

A polyurethane resin polymer that is terminated on each end with a silane group, and has appended thereto at least one additional silane group.

11 Claims, No Drawings

POLYMER AND ADHESIVE COMPOSITION

FIELD OF THE INVENTION

This invention relates to polyurethane-based moisture-curable polymer sealant compositions containing silane. 5 of the Invention

BACKGROUND OF THE INVENTION

Polymeric sealants have a wide variety of applications, and are widely used in manufacturing industries such as the automotive industry and the building trades industry. In the automotive industry, sealants are widely used to seal fixed glass panels to vehicle body panels. Polymer sealants are generally pigmented or unpigmented synthetic elastomeric polymers that form pourable or easily-extrudable mastics in the uncured state. When cured, the sealants are transformed into elastomeric materials that have viscoelastic properties, and can react to the relative motion of the structural elements with which the sealant is brought into contact to form a seal. The cured sealants thus form a tight barrier against moisture, gases, and chemicals.

Sealant compositions are often based on polysiloxane polymers as well as others that include polyurethane or polyacrylate polymers. Sealant compositions can be of the one-part or two-part variety, which cure by a variety of chemical mechanisms. One-part sealant compositions generally contain an end-capped base polymer together with a reactive cross-linking agent and, usually, a curing catalyst that promotes the cross-linking reaction either when heated or exposed to atmospheric moisture. Upon application under normal conditions of temperature and moisture, one-part sealants react to form tough, pliable elastomeric seals.

Two-part sealant compositions, on the other hand, comprise two reactive components that are separately packaged and mixed just prior to or at the time of application and react upon mixing to form the semi-rigid sealant bead. Two-part sealant compositions, are less convenient to use since it is necessary to accurately premeasure and mix the components prior to use or accurately meter the component during application to insure correct proportions. For this reason, one-part sealants have found wider acceptance in the market. A number of such one-part moisture-curable sealant compositions are known.

In modern automotive design construction, the windshield is an integral part of the structural integrity of the vehicle. Thus, it is critical that the windshield sealant securely bond the windshield to the vehicle body panels. One-component moisture cure sealant possess many advantages, but fall far short of the requirements with respect to adhesion to a variety of surfaces. It is therefore often necessary to coat the glass with a primer prior to adhering and sealing it to the vehicle body panel. It would thus be desirable to provide a one-part sealant that exhibited good adhesion to a variety of surfaces, particularly when one of the surfaces is glass either with or without a glass primer.

SUMMARY OF THE INVENTION

It has been found in accordance with the present invention that a new polyurethane resin polymer is useful in one-component polyurethane-based sealant composition. This polymer is terminated on each end with a silane group, and has at least one additional silane group appended thereto.

The silane-containing polyurethane polymer can be characterized as having the following structure:

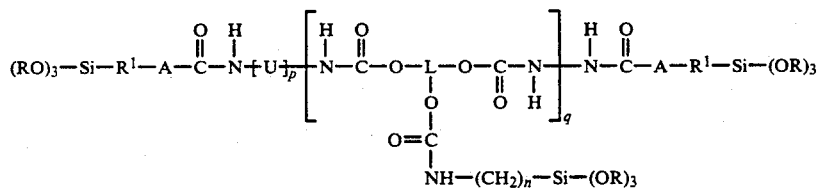

wherein n is an integer of from 3 to 10, p is an integer of from 50 to 100, q is an integer of from 3 to 50, R is lower alkyl of from one to six carbon atoms, U is a polyurethane having at least two urethane linkages per molecule, and $R^1$ is a divalent bridging radical selected from the group consisting of divalent hydrocarbon radicals, divalent hydrocarbon ether radicals, and divalent hydrocarbon amino radicals. The group L is a trivalent aliphatic group having from 3 to 50 carbon atoms. The group A is —S— or —$NR^2$— where $R^2$ is hydrogen or alkyl of from one to six carbon atoms. The brackets in the above formula denote randomly repeating units with the total number of such repeat units in the polymer represented by p and q.

The polymer of the present invention is useful in forming adhesive sealant compositions having fast cure rates at room temperature in the present of moisture. The sealant compositions of the present invention adhere to and seal articles having a variety of surface characteristics. They adhere to both smooth and rough surfaces, and are particularly useful for adhering glass to automotive body panels with or without the use of a primer on the surface of the glass.

DESCRIPTION OF THE PREFERRED EMBODIMENTS

The polyurethane resin polymer of the present invention has a terminal silane group on each end of the polymer and at least one additional silane group appended at some other position on the polymer. By "appended thereto", it is meant that the additional silane group is attached to the polymer backbone at some point other than the two terminal endpoints of the molecule. The polymer preferably comprises from 0.2 to 1.0 parts by weight of aminosilane per 100 parts by weight of the polyurethane polymer.

The polymer of the invention can be characterized by the formula:

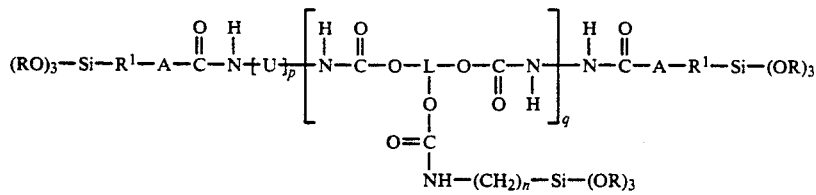

where n, p, q, U, R, R¹, L, and A are defined above. By way of example, R¹ can be a divalent hydrocarbon radical (preferably of 3 to 6 carbon atoms, e.g., —CH$_2$CH$_2$CH$_2$—), a divalent hydrocarbon ether radical (e.g., —CH$_2$CH$_2$CH$_2$—O—), or a divalent hydrocarbon amino radical (e.g., —CH$_2$CH$_2$CH$_2$—NH—). L can be a trivalent hydrocarbon radical

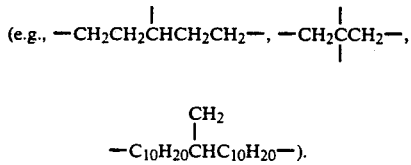

The polymer should have a number average molecular weight in the range of 10,000 to 60,000.

Such silane-capped polyurethane polymers are prepared by conventional polymerization techniques similar to those described in U.S. Pat. No. 3,979,344 to Bryant et al., the disclosure of which is incorporated herein by reference. In the practice of the present invention, preparation of the polymer is accomplished by reacting a polyether polyol having at least three free hydroxyl groups per molecule (e.g., trimethanol propane) with an equivalent or less than equivalent amount of isocyanate alkoxy silane compound (e.g., isocyanate propylmethoxysilane) to form a silane-modified hydroxyl-containing compound. This compound is then mixed with additional polyols, such as Pluracol ® 2010 (available from BASF Corp.), Niax ® 2025 (available from Union Carbide), or compounds of the Voranol ® series (available from the Dow Chemical Company), and then reacted with diisocyanate to form a polyurethane prepolymer having a pendant silane group, and terminal isocyanate groups. The prepolymer is reacting it with active hydrogen-containing alkoxysilane compounds. Preferred reaction conditions are anhydrous, with temperatures of between 40° C. and 80° C. The polyurethane formation reaction may be catalyzed with a tin catalyst, such as dibutyltindiacetate.

The polyether polyol and isocyanate compound are reacted in a weight ratio of about 8:1 to about 12:1, respectively. The starting polyether polyol preferably has a 10 number average molecular weight of between about 1,000 and 5,000. Useful polyether polyols include Pluracol" 2010 (available from BASF Corp.), Niax ® 2025 (available from Union Carbide), or compounds of the Voranol ® series (available from the Dow Chemical Company).

The starting isocyanate compound may be selected from a variety of materials known in the art for such purposes, such as p-phenylene diisocyanate, biphenyl-4,4'-diisocyanate, toluene diisocyanate (TDI), 3,3'-dimethyl-4,4'-biphenylene diisocyanate, 1,4-tetramethylene diisocyanate, 1,6-hexamethylenediisocyanate, 2,2,4-trimethylhexane-1,6-diisocyanate, methylene bis-(phenyl isocyanate), 1,5-naphthalene diisocyanate, isophorone diisocyanate (IPDI), and methylene bis-(4-cyclohexylisocyanate). A preferred material is toluene diisocycanate.

The copolymer formed by reaction of these three monomers is capped with a silane group having the structure —A—R¹—Si—(OR)$_3$. The group A can be sulfur, —NH—, or an alkylamino group in which the alkyl portion contains from one to six carbon atoms. The bridging group R¹ may be a divalent hydrocarbon radical, a divalent hydrocarbon radical containing one or more oxygen ether linkages, or a divalent hydrocarbon radical containing one or more —NH— linkages. The end-capping of the polyurethane polymer is achieved by including in the reaction mixture containing the polyether polyol and isocyanate compound an aminosilane compound such as gamma-aminopropyltrimethoxysilane, gamma-aminopropyltriethoxysilane, and N-beta-aminoethylgamma-aminopropyltrimethoxysilane (available from Union Carbide Corp. and Dow Chemical Co.).

As used herein, the term "alkyl" means a hydrocarbon residue derived from branched or unbranched alkane by removal of a single hydrogen atom. The term "alkoxyl" denotes alkyl groups attached through an oxygen ether linkage to the remainder of the parent molecule. The term "divalent hydrocarbyl" means a branched or unbranched hydrocarbon group derived by removal of two hydrogen atoms from a saturated or unsaturated acyclic hydrocarbon. The term "divalent hydrocarbaryl" denotes a group derived from the removal of two hydrogen atoms from hydrocarbons containing one or more carbocyclic aromatic rings including phenyl, alkylphenyl, and phenylalkyl and the like. The term "divalent cyclohydrocarbyl" means a group derived by the removal of two hydrogen atoms from a carbocyclic non-aromatic hydrocarbon ring including cyclohexane, alkylcyclohexane, and the like.

The polymer of the present invention is useful in sealant compositions. Such compositions preferably comprise, in addition to the polurethane resin polymer, an adhesion promoting agent. The polyurethane base polymer may be mixed with from about 2.0 to about 10.0 parts by weight, preferably from about 4.0 to about 8.0 parts by weight, (based on 100 parts by weight of the base polyurethane polymer) of an adhesion promoting agent, such as an aminosilane. One preferred adhesion promoter is a functional silane, including hydrohalic salts, such as a compound of the structure:

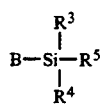

where $R^3$, $R^4$ may and $R^5$ may be the same or different and are selected from alkyl and alkoxyl of from one to four carbon atoms.

The group B is

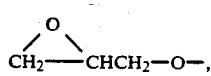

or $R^7-NH-(CH_2)_y-NH-(CH_2)_x-$, or $H_2N(CH_2)_2-NH-(CH_2)_7-NH-(CH_2)_x-$, wherein x is an integer of from one to six, $R^7$ is an alkyl group of from one to four carbon atoms, and y and z may be the same or different and are integers of from one to six.

Preferred adhesion promoters using for the purposes of this invention include gamma-aminopropyl-trimethoxysilane, gamma-aminopropyltriethoxy-silane, N-beta-aminoethyl-gamma-aminopropyltrimethoxysilane, gamma-glycidylpropyltrimethoxysilane, and N-2-aminoethyl-N-3-aminoethyltrimethoxy-silylpropyl-1,2-ethanediamine (available 10 from Union Carbide Corp.) and N-2-[4-vinyl-(benzeneamino)]ethyl-3-aminopropyl-trimethoxysilane monohydrochloride (available as Z-6032 from Dow Corning Co.).

The composition may further include from about 20 to about 60 parts by weight of a pigmenting agent and/or filler such as carbon black, from about 0.02 to about 0.2 parts by weight of a curing catalyst, and from about 0.3 to about 0.6 parts by weight of an accelerator, all weights based on 100 parts by weight of the capped polyurethane polymer.

Suitable curing catalysts for purposes of this invention include metallic salts of tin, lead, mercury, or Group VIII elements; organo-iron, organo-tin (IV) and organo-lead compounds; aliphatic or aromatic carboxylic acids; toluenesulfonic acid; salts of organic acids such as tin naphthenate, tin acetate, tin butyrate, dibutyltin diacetate, dibutyltin diacetate, dibutyltin dilaurate, iron stearate, or lead acetate; and organic amines such as trialkylamines, N-substituted piperidines, N,N'-substituted piperazines, and pyridine. The preferred curing catalyst for compositions of the present invention is dibutyltin diacetate.

Suitable accelerating agents for use in the compositions of the present invention are titanate esters of the type disclosed in U.S. Pat. Nos. 4,600,689 and 4,623,738, the contents of which are incorporated herein by reference. It is preferred that the titanate esters which are employed as accelerators possess at least one primary or secondary amine group per molecule. Preferred materials include (4-aminobenzene)sulfanato-0, bis-(dodecylbenzene)sulfanato-0, 2propanolato titanium (IV) (KR ® 26S); 2-propanolato, tris-(3,6-diaza)hexanolato titanium (IV) (KR ® 44); 2,2-bis-(2-propenolatomethyl)butanolato, tris-(2-ethylenediamino)ethylatotitanium (IV) (Lica ® 44); and 2,2-bis-(2-propenolato-methyl)butanolato, tris-(3-amino)-phenylato titanium (IV) (Lica ® 97), commercially available from Kenrich Petrochemicals, Inc., 140 East 22nd Street, Bayonne, N.J. 07002). The preferred material is Lica ® b 44.

Additionally, small amounts, ranging from about 0.25 to about 0.75 parts by weight, of a thixotropic agent per 100 parts by weight of polyurethane polymer may also be added to adjust the flow characteristics of the sealant composition. A typical thixotropic agent suitable for this purpose is Thixseal ® 1085 available from NL Chemicals, Inc., Heightstown, N.J. 08520.

Optionally, from about 1.0 to about 10.0 parts by weight of flexibilizing agent, preferably from about 2.0 to about 5.0 parts by weight, may be added to the composition, based on 100 parts by weight of the polyurethane base polymer. Suitable flexibilizing agents for inclusion in the compositions of the present invention include dioctyl phthalate, dibutyl phthalate, diundecyl phthalate (available under the Platinol ®line of plasticizers from BASF Corp., Paramus, N.J. 07652), and dioctyl adipate and butyl benzyl phthalate, isodecyldiphenyl phosphate (available as Santicizer ® 160 and 148, respectively, from Monsanto Chemical Co., St. Louis, Mo. 63166), N-butyl-p-toluene-sulfonamide and N-ethyl-p-toluene-sulfonamide, (available as Ketjenflex ® 8 from Akzo Chemie America, 300 South Riverside Plaza, Chicago, Ill. 60606).

The composition may also optionally include from about 5 to about 20 parts by weight, preferably about 10 parts by weight of a silane- or silicone-surface-treated clay, per 100 parts by weight of the base polymer. Because normal clays (e.g. magnesium and aluminum silicates) contain particle surface hydroxyl groups which are reactive toward the polymeric components of the sealant composition, the clays useful in formulating the sealants of this invention must be surface treated to cap the otherwise reactive hydroxyl groups. This is accomplished by treating the clay with a trialkylsilyl chloride or trialkoxysilyl chloride or mixed tri(alkyl/alkoxy)silyl chloride such as trimethylsilylchloride, trimethoxysilyl chloride, methyldimethoxysilyl chloride and the like.

The sealant composition of the present invention can be used to seal and/or adhere essentially any article to essentially any other article, as is well-known in the art. In one preferred embodiment of the invention, the sealant is used to affix a fixed glass panel, such as a windshield, to automotive body panels. The adhesive qualities of the sealant composition of the invention make it particularly well-suited for sealing glass articles that have not been coated with a glass primer. Techniques for affixing glass panels to automotive body panels are well-known in the art as disclosed, for example in U.S. Pat. No. 4,954,498, the disclosure of which is incorporated herein by reference.

The invention is further described in the following examples, which are merely illustrative and are not to be read as limiting the scope of the invention.

PREPARATION 1

Silane-containing diol

A trimethanol propane: 80.4 g

B anhydrous toluene: 80 g
dibutyltin diacetate (T-1): 0.02 g
C Isocyanatepropyltrimethoxysilane: 148.26 g Component A was melted in component B and kept at 110° F. under anhydrous conditions. After 10 minutes of mixing, component C was added. This mixture was stirred for 30 minutes at 170° F., and then a sample was checked for free isocyanate. When no free isocyanate was, found the mixture was cooled to room temperature.

PREPARATION 2

Silane-containing diol

| A. Pluracol ® TP440 | 100 g |
|---|---|
| anhydrous toluene | 40 g |

| | |
|---|---|
| T-12 | .02 g |
| B. Isocyanatepropyltrimethoxysilane | 56.2 g |

Starting with 100 g of Pluracol® TP440 and 56.2 g of B, the procedure described in Preparation 2 was used to prepare 100 g of this sample.

PREPARATION 3

Silane diol

Starting with 200 g of Pluracol® TP730 and 67.7 g of Isocyanatepropyltrimethoxysilane, the procedure described in Preparation 2 was used to prepare 100 g of this sample.

PREPARATION 4

Preparation of base polyurethane

A polyurethane polymer was prepared as follows:

| Chemical Amount | Available From |
|---|---|
| Pluracol® P2010<br>2001 g<br>a 2000 molecular weight<br>polyether polyol | BASF Corporation<br>100 Cherry Hill Road<br>Parsippany, NJ 07054 |
| silane-containing diol (preparation 1)<br>135 g | |
| dibutyltin diacetate<br>0.45 g | |
| anhydrous toluene<br>110 g | |
| toluene diisocyanate (TDI)<br>379 g | BASF Corporation<br>100 Cherry Hill Road<br>Parsippany, NJ 07054 |
| Silane® A1110<br>47 g<br>gamma-aminopropyl-ticmethyorysilane | Union Carbide Corp.<br>270 Park Ave.<br>New York, NY 10017 |
| anhydrous methanol<br>170 g | |

The polyol, silane-containing diol, dibutyltin diacetate, and anhydrous toluene were mixed and heated to 180° F. under anhydrous conditions and maintained at this temperature for 10 minutes. At the end of this time, the TDI, kept at 110° F., was added and the mixture stirred for the next 50 minutes at 140°-160° F. At the end of this time, the mixture temperature was reduced to 110° F., and the gamma-aminopropyl-trimethoxysilane was added. The mixture was again heated to 140°-160° F. and mixed for 30 minutes. During this time, the reaction mixture was tested for free isocyanate groups. When the test indicated no free isocyanate groups remained, the anhydrous methanol was added and the mixture degassed and cooled to room temperature under anhydrous conditions.

EXAMPLE 1

Preparation of sealant composition

This example describes the preparation of sealant composition containing a base polymer with silane diol from Preparation 2.

A two-gallon Meyers mixer with dual mixing blades was charged with 1500 g of the silane containing polyurethane polymer of Preparation 2 and throughly mixed under a slight vacuum with 125 g of anhydrous methanol, 1.25 g of dibutyltin diacetate (T-1) and 6.25 g of A1120 (N-beta-aminoethyl-gamma-amiopropyltrimethyoxysilane, from Union Carbide). 600 g of carbon black previously dried to less than 0.05% by weight moisture content, was added and mixed for 40 minutes under vacuum. The sealant was then collected under anhydrous conditions.

The final sealant material had the following composition, normalized to 100 parts by weight of the base polyurethane polymer.

| COMPONENT | PARTS BY WEIGHT |
|---|---|
| Base polyurethane polymer | 100 |
| Solvent (methanol) | 8.3 |
| Carbon black | 40 |
| A1120 | 0.42 |
| T-1 | .083 |

EXAMPLE 2

This example describes the preparation of sealant with a base polyurethane polymer using the silane diol of Preparation 3. The procedure of Example 1 was followed to prepare a sealant material having the composition given below.

| COMPONENT | PARTS BY WEIGHT |
|---|---|
| Base polyurethane polymer | 100 |
| Solvent (methanol) | 8.3 |
| Carbon black | 40 |
| A1120 | 0.42 |
| T-1 | .083 |

EXAMPLE 3

Preparation of sealant containing a base polyurethane polymer using the silane diol from Preparation 4. The procedure of Example 1 was followed to prepare a sealant having the composition given below.

| COMPONENT | PARTS BY WEIGHT |
|---|---|
| Base polyurethane polymer | 100 |
| Solvent (methanol) | 8.3 |
| Carbon black | 40 |
| A1120 | 0.42 |
| T-1 | .083 |

EXAMPLE 4

The procedure from Example 1 was followed to prepare a sealant composition in which the filler level was increased with clay. The material had the following composition.

| COMPONENT | PARTS BY WEIGHT |
|---|---|
| Base polyurethane polymer | 100 g |
| Solvent (methanol) | 8.3 |
| Carbon Black | 20.0 |
| Clay | 30 |
| A1120 | .42 |
| T-1 | .083 |

EXAMPLE 5

The procedure of Example 1 was followed to prepare a sealant composition in which the solvent was replaced with a plasticizer. The material had the following composition.

| | |
|---|---|
| Base polyurethane polymer | 100 g |
| Carbon Black | 20 |
| Clay | 30 |
| Plasticizer | 10 |
| A1120 | .42 |
| T-1 | .083 |

EXAMPLE 6

The lap shear strength of several material prepared in accordance with the teachings of the present invention were tested according to the following method. In each instance, pairs of shear strength test plates were prepared by bonding two previously primed and painted steel plates, each 1 inch by 0.32 inches (2.54 cm×0.81 cm), with a sealant bead 1 inch long by 0.25 inches wide by 5/16 inches thick (2.54 cm×0.64 cm×0.79 cm). The sealant bead was applied along one of the one-inch edges of the test plates by means of a sealant tube. The plates were then pressed together so that the sealant bead was about 0.25 inches (0.64 cm thick).

The sealant bead applied to the bonded test plates was allowed to cure at room temperature and 50% relative humidity for periods that varied between three hours and seven days. After the appropriate cure time in each case, the shear strength of each sealant bead was tested on an Instron testing machine by pulling in a direction parallel to the faces of the bonded test plates. Hardness was measured using a Shore A durometer according to the procedure of ASTM D2240. Tensile strength in 1 bs/in$^2$ was measured according to ASTM D1002. The results of these tests, along with other properties of the tested compositions, appear in the following Table 1.

TABLE 1

Shear strength and properties of sealant composition of the present inventions.

| | Shear Strength (lbs/in$^2$) | | | | | |
|---|---|---|---|---|---|---|
| | 3 hr. | 24 hrs. | 48 hrs. | 7 days | Tensile | % Elongation | Shore A |
| 1 | 85 | 390 | 540 | 700 | 900 | 250 | 60 |
| 2 | 75 | 350 | 505 | 680 | 825 | 300 | 55 |
| 3 | 70 | 335 | 465 | 640 | 775 | 325 | 50 |
| 4 | 75 | 370 | 520 | 685 | 850 | 225 | 65 |
| 5 | 78 | 320 | 470 | 595 | 725 | 300 | 50 |

The data in Table 1 indicated that by incorporating longer molecular weight triols, the sealant has increased elongation along with a reduced shore hardness. These properties provide for a more flexible bond with greater energy absorbing properties.

EXAMPLE 7

The shear strength of a sealant according to Example 1 was compared to a sealant according to Example 3 of U.S. Pat. No. 4,889,903 at 73° F. and 30% relative humidity. The shear strengths in psi are set forth below in Table 2.

TABLE 2

| COMPARATIVE DATA LAP SHEAR CURE RATE | | |
|---|---|---|
| HR | COMPARISON | EXAMPLE 1 |
| 1 | 20 | 35 |
| 2 | 35 | 50 |
| 3 | 60 | 85 |
| 4 | 85 | 110 |
| 5 | 105 | 145 |
| 24 | 275 | 390 |

TABLE 2-continued

| COMPARATIVE DATA LAP SHEAR CURE RATE | | |
|---|---|---|
| HR | COMPARISON | EXAMPLE 1 |
| 48 | 415 | 540 |

The data in table 2 shows that sealant from Example 1 has an increased cure speed versus the comparison sealant. This provide for a more durable bond in a reduced amount of time.

EXAMPLE 8

Sealants were prepared according to Example 5, but with varying amounts of the plasticizer diisodecylphthalate. The shear strengths were evaluated according to the procedure set forth in Example 6, with curing at 73° F. and 30% relative humidity for 3 hours. The results, showing comparative results for a sealant according to Example 3 of U.S. Pat. No. 4,889,903 are set forth in Table 3.

TABLE 3

| LEVEL OF PLASTICITY (DIDP) VS LAP SHEAR STRENGTH | | |
|---|---|---|
| % DIDP | COMMERCIAL SEALANT | EXAMPLE 9 |
| 10 | 47 | 78 |
| 15 | 38 | 65 |
| 20 | 29 | 57 |
| 25 | 19 | 48 |

The data in Table 3 show the improved ability of sealant from example 5 to tolerate increased plasticizer levels while maintaining bond strength and cure speed. This imparts a cost advantage allowing for increased loading of sealants with plasticizer.

EXAMPLE 9

A sealant composition from Example 3 was compared to a sealant according to Example 3 of U.S. Pat. No. 4,889,903 for ability to adhere to a variety of substrates. Two glass plates were adhered together with the sealant, and subjected to tensile stress to cause the bond to fail. The proportion of the bonded area that failed due to cohesive failure is set forth below in Table 4 as % CF.

TABLE 4

| ADHESION TO VARIOUS SUBSTRATES | | |
|---|---|---|
| SUBSTRATE | COMMERCIAL SEALANT | EXAMPLE 7 |
| Sandblasted aliminum | 50% CF | 100% CF |
| Sandblasted cold rolled steel | 40% CF | 100% CF |
| Ceramic tile | 85% CF | 100% CF |
| Wood | 50% CF | 100% CF |
| Glass | 90% CF | 100% CF |

The data in Table 4 demonstrate the increased adhesive properties of a sealant from example 7 versus the comparison sealant on a wide variety of surfaces.

What is claimed is:

1. A polyurethane resin polymer that is terminated on each end with a silane group, and has appended thereto at least one additional silane group.

2. A polyurethane resin polymer according to claim 1 comprising:

a first polyurethane backbone moiety that is terminated on one end with a silane group,
a second polyurethane backbone moiety that is terminated on one end with a silane group,
interposed between the two polyurethane backbone moieties, at least one polyurethane moiety having a silane group appended thereto.

3. A polyurethane resin polymer according to claim 1 comprising from 0.2 to 1.0 parts by weight of aminosilane per 100 parts by weight of the polymer.

4. A polyurethane resin polymer according to any one of claims 1-3 according to the formula:

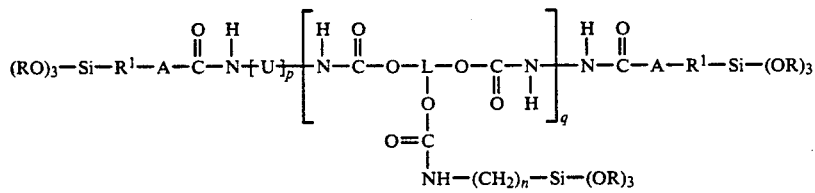

wherein
n is an integer of from 3 to 10,
p is an integer of from 50 to 100,
q is an integer of from 3 to 50,
U is a polyurethane containing at least two urethane linkages per molecule,
L is a trivalent aliphatic group having from 3 to 50 carbon atoms,
A is —S— or NR$^2$— where R$^2$ is hydrogen or alkyl of from one to six carbon atoms,
R is lower alkyl of from one to six carbon atoms, and
R$^1$ is a divalent bridging radical selected from the group consisting of divalent hydrocarbon radicals, divalent hydrocarbon ether radicals, and divalent hydrocarbon amino radicals.

5. A sealant composition comprising
a polyurethane resin polymer that is terminated on each end with a silane group, and has appended thereto at least one additional silane group and
a pigmenting agent or filler.

6. A sealant composition according to claim 5 wherein said additional silane group is appended to a urethane linkage on a polyurethane group that forms part of the backbone of the polymer.

7. A sealant composition according to claim 5 wherein said polymer comprises:
a first polyurethane backbone moiety that is terminated on one end with a silane group,
a second polyurethane backbone moiety that is terminated on one end with a silane group,
interposed between the two polyurethane backbone moieties, at least one polyurethane moiety having a silane group appended thereto.

8. A sealant composition according to claim 5 wherein said polymer comprises from 0.2 to 1.0 parts by weight of aminosilane per 100 parts by weight of the polymer.

9. A sealant composition according to claim 5, further comprising an adhesion promoter having the structure:

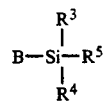

where R$^3$, R$^4$ may and R$^5$ may be the same or different and are selected from alkyl and alkoxyl of from one to four carbon atoms. The group B is

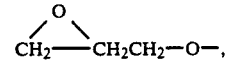

or
—R$^7$—NH—(CH$_2$)$_y$—NH—(CH$_2$)$_x$—, or
H$_2$N(CH$_2$)$_z$—NH—(CH$_2$)$_y$—NH—(CH$_2$)$_x$—, wherein x is an integer of from one to six, R$^7$ is an alkyl group of from one to four carbon atoms, and y and z may be the same or different and are integers of from one to six.

10. A polyurethane resin polymer according to the any of claims 5-9 according to the formula:

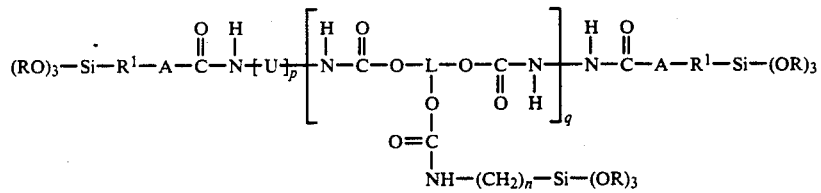

wherein:
n is an integer of from 3 to 10,
p is an integer of from 50 to 100,
q is an integer of from 3 to 50,
U is a polyurethane containing at least two urethane linkages per molecule,
L is a trivalent aliphatic group having from 3 to 50 carbon atoms,
A is —S— or —NR$^2$— where R$^2$ is hydrogen or alkyl of from one to six carbon atoms,
R is lower alkyl of from one to six carbon atoms, and
R$^1$ is a divalent bridging radical selected from the group consisting of divalent hydrocarbon radicals, divalent hydrocarbon ether radicals, and divalent hydrocarbon amino radicals.

11. A method for making a polyurethane resin polymer, comprising the steps of:
reacting a polyether polyol having at least three free hydroxyl groups per molecule with an equivalent or less than equivalent amount of isocyanate alkoxy silane compound to form a silane-containing polyether polyol compound having at least two free hydroxyl groups per molecule, mixing the silane-containing polyether polyol compound with additional polyol, reacting the mixture with an excess of a diisocyanate compound to form a polyurethane prepolymer having pendant and terminal silane groups, and capping the prepolymer at the isocyanate sites with silane groups by reacting it with an active hydrogen-containing alkoxysilane compound.

* * * * *